United States Patent

[11] 3,598,136

[72] Inventor Ralph G. Zaginailoff
 Beverly, Mass.
[21] Appl. No. 807,888
[22] Filed Mar. 17, 1969
[45] Patented Aug. 10, 1971
[73] Assignee Avco Corporation
 Cincinnati, Ohio

[54] FLUIDIC INFRARED SENSING DEVICE
 9 Claims, 3 Drawing Figs.
[52] U.S. Cl. ................................................ 137/81.5,
 73/357
[51] Int. Cl. .................................................. F15c 1/14,
 G01j 5/38
[50] Field of Search ........................................ 137/81.5;
 235/201; 73/193, 355, 357; 250/43.5, 83.3 IR

[56] References Cited
UNITED STATES PATENTS
3,040,176 6/1962 Rempka et al. ............... 250/83
3,228,411 1/1966 Straub .......................... 137/81.5
3,314,294 4/1967 Colston ........................ 137/81.5 X Primary Examiner—William R. Cline
Attorneys—Charles M. Hogan and Gary M. Gron ABSTRACT: The disclosure illustrates a fluidic infrared sensor comprising a thermally conductive, laminar flow element exposed to infrared energy and series connected with a control jet of a proportional fluidic amplifier. The laminar flow element is heated, thereby varying the flow of the control jet and the deflection of the amplifier's power stream to produce a pressure output proportional to the level of infrared energy. In order to maximize the amplifier output due to very low levels of infrared energy, the laminar flow element is positioned in a thermal insulating chamber having a reflective inner surface. An opening in line with the focus point of a reflective parabolic mirror permits concentrated infrared energy to be applied to the fluidic device positioned in line with the opening. An alternate laminar flow element for this application senses the direction from which the infrared source originates.

PATENTED AUG 10 1971 3,598,136
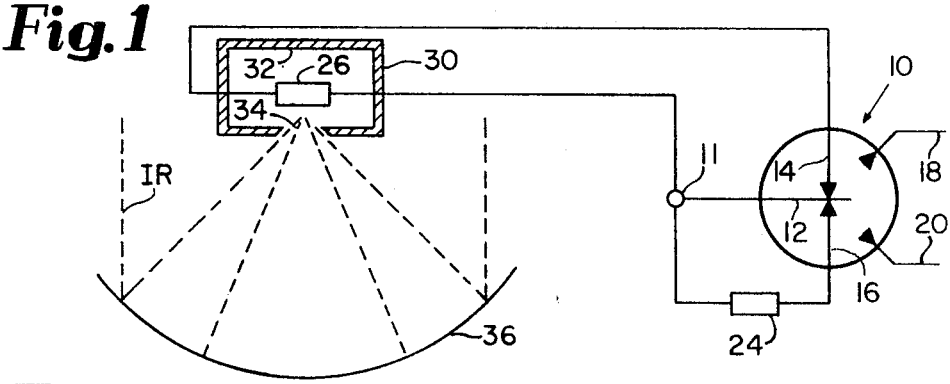
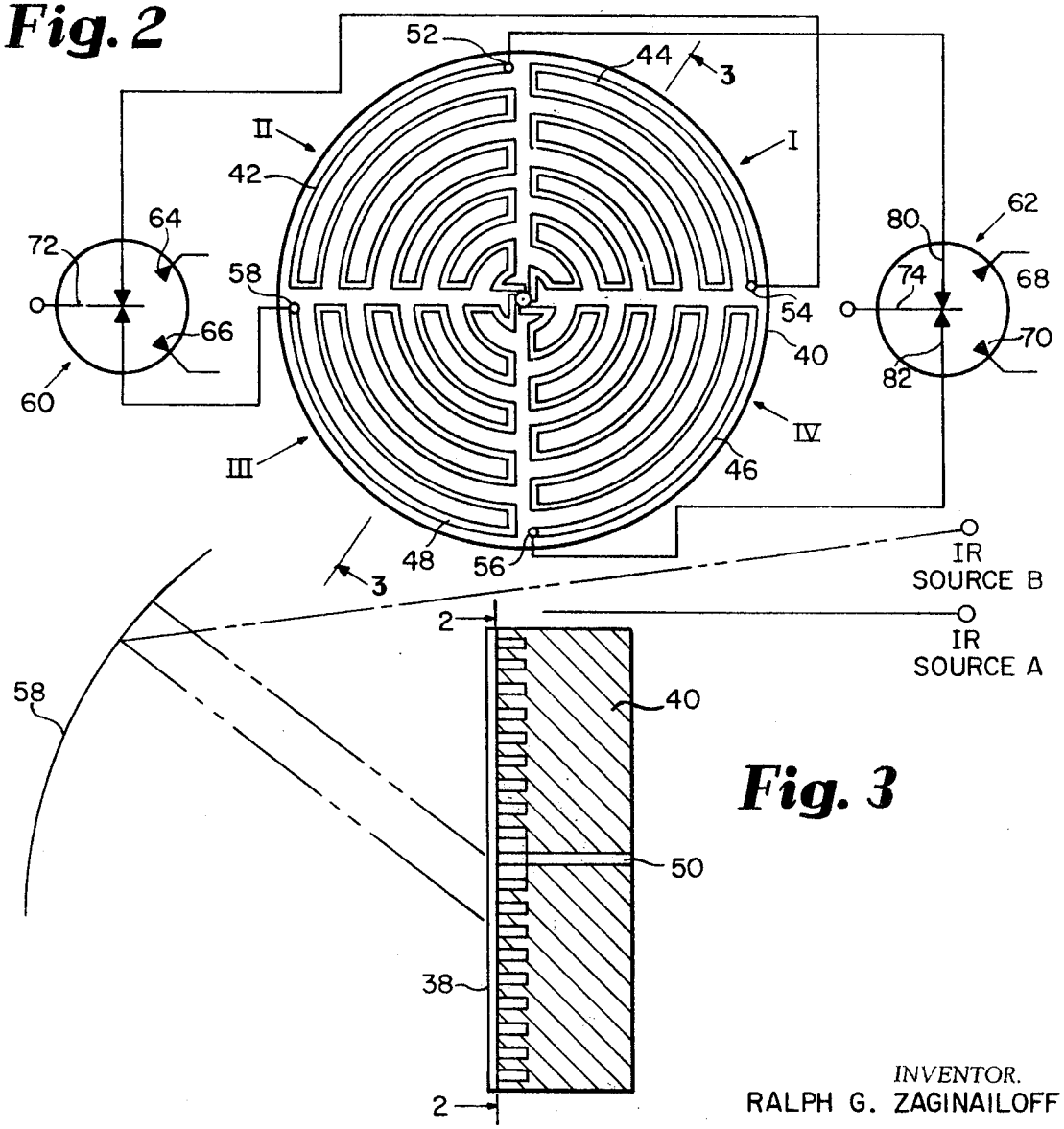
INVENTOR.
RALPH G. ZAGINAILOFF
BY Charles M. Hogan
Gary M. Gron

FLUIDIC INFRARED SENSING DEVICE

The present invention relates to energy-sensing devices and more particularly to infrared energy-sensing devices.

Infrared sensors have been utilized for many purposes in recent years, e.g. heat-seeking homing missiles. Almost exclusively, present infrared sensors are electronic devices having highly sophisticated and complicated circuitry to convert the infrared energy into a usable output.

In light of the above, the present invention has as one of its objects the provision of a highly effective, efficient and simplified infrared sensing device having an output which may be easily incorporated into a control or recording system.

These ends are attained by an infrared fluidic sensing device having a means for discharging a power stream. A means is provided for discharging a control jet against the power stream so that the power stream is deflected proportional to the flow of the control jet. A receiver means is positioned relative to the power stream to provide a pressure output responsive to the degree of deflection of the power stream. A laminar flow element is series connected with the control jet discharge means and a means is provided for concentrating infrared energy on the laminar flow element. The laminar flow element is adapted to convert the infrared energy into heat transmitted to the control jet fluid for varying the flow through the laminar flow element proportional to the level of exterior infrared energy. As a result, the deflection of the power stream and the pressure output of the fluidic device is proportional to the level of the infrared energy.

It is a further object of the present invention to provide a fluidic infrared indicating device of the above general type which has an output indicative of the direction from which the infrared energy emanates.

This more specific object of the present invention is achieved by a fluidic device for sensing the direction of a source of infrared energy. The device comprises at least a pair of laminar flow elements positioned in a plane and symmetrical with respect to a centrally positioned point. A parabolic reflector which receives infrared energy, focuses the energy on the centrally positioned point when the source of the infrared energy is at a point generally coaxial with the axis of revolution of the parabolic reflector. The reflector focuses energy on one of the elements when the source is offset from the axis. A means is provided for a flow path of control fluid through the laminar flow elements. A fluidic device receives control inputs from the laminar flow elements and provides a pressure output as a function of the relative flow rate of control fluid from the laminar flow elements. The laminar flow elements are adapted to convert the infrared energy focused on them into heat transmitted to the control fluid for varying the flow input to the fluidic device proportional to the level of the infrared energy. As a result, the pressure output of the fluidic device is indicative of the position of the source of infrared energy.

The above and other related objects and features of the present invention will be apparent from a reading of the following description of the disclosure found in the accompanying drawing and the novelty thereof pointed out in the appended claims.

In the drawing:

FIG. 1 illustrates in diagrammatic fashion a fluidic infrared energy-indicating device embodying the present invention;

FIG. 2 is an enlarged view, taken on lines 2–2 of FIG. 3, showing a preferred fluidic device embodying the present invention; and FIG. 3 is a view taken on lines 3–3 of FIG. 2.

FIG. 1 illustrates an infrared sensing device comprising a proportional fluidic amplifier 10. The amplifier 10, shown in schematic fashion, receives a supply of pressurized fluid from a suitable source 11. As herein illustrated, a common supply for power and control purposes is used for the sake of simplicity. In practice, however, separate sources having different pressure levels could be utilized with equal effectiveness. The amplifier 10 discharges a power stream 12 which is deflected in response to varying flows from a pair of oppositely positioned control jets 14, 16. The deflected power stream impinges on a pair of receiver ports 18, 20. The pressure difference between these ports is then a function of the difference in pressure or flow between the control jets from the ports 14, 16.

The flow of control jet 16 is controlled by a variable sharp-edged orifice 24, series connected between the supply source 11 and the control jet 16. The fluid flow of control jet 14 is controlled by a laminar flow element 26, series connected between the supply source 11 and the control jet 14. The laminar flow element 26 is suitably mounted in the interior of a housing 30. The housing 30 is formed from thermal insulating material and has an interior chamber 32 with a reflective surface. An opening 34 is provided in one side of the housing 30. The opening 34 is in line with the focus point of a parabolic or other reflector 36 which receives infrared rays IR from a distant source and focuses them on the laminar flow element 26.

The laminar flow element 26 is comprised of a passageway having a length and width that insures laminar flow through the passageway for the operating conditions of the amplifier 10. The passageway is formed in a body which has a low thermal capacity and a high thermal conductivity for the portion exposed to the energy so that a given quantity of energy produces a maximum heat transfer to the fluid flowing through the element. In addition, the portion of the body not exposed to the energy is formed from thermal insulating material to minimize heat losses from the fluid as it flows through the device.

A laminar flow element which is particularly suited for this purpose may be found in copending application, Ser. No. 806,833, filed Mar. 13, 1969, entitled "Fluidic Temperature Sensor," in the names of Ralph G. Zaginailoff and Roger M. Babcock and of common assignment with the present invention. The laminar flow element described in that application produces a high heat transfer to the fluid flowing through its passageway for a given level of energy. However, for the present environment it is desirable to blacken the surface of the device which is exposed to the energy. For the particular device illustrated, the silver sheet may be blackened by exposure to hydrogen sulfide.

In operation, the infrared rays IR are concentrated on the laminar flow element 26 by the parabolic reflector 36. The impingement of the infrared energy on the element 26 causes the fluid flowing through the element to be heated and, in accordance with the equations governing laminar flow, varies the flow through the element as a direct or inverse function of the level of infrared energy, depending upon whether a liquid or a gas is used for the fluid amplifier. The change in flow of the control jet 14 causes the power stream 12 to be deflected and impinge to a greater extent on one of the receiving ports 18, 20. The resultant pressure output provides an indication of the level of infrared energy.

Since the laminar flow element is positioned in an insulating chamber, stray infrared sources and stray thermal sources are blocked out. The effect of the sensed infrared energy, however, is maximized by the parabolic reflector 36 and the reflective coating on the interior chamber of the housing 30. In addition, the blackened surface for the surface of the element 26, exposed to the rays, gives the highest possible absorptivity in the infrared range.

It may be desirable to provide a null output from the amplifier 10 for a given level of infrared energy. For this purpose the variable sharp-edged orifice 24 is provided in series with the opposite control jet 16. Thus the relative flows of the control jets may be adjusted to provide an undeflected power stream for a given level of infrared energy.

The above fluidic sensor provides a highly effective indication of the level of infrared energy. However, the fluidic sensor illustrated in FIGS. 2 and 3 provides an indication of the source of the infrared energy relative to the indicating device.

The fluidic sensor comprises a circular base 40 of suitable insulating material, such as glass. A plurality of grooves 42, 44, 46 and 48 are formed in one face of the base. As herein illustrated, each of the grooves defines a circuitous flow path which generally covers a particular portion of the face of the base 40. While other configurations may be utilized with equal effectiveness, the grooves are formed to fill 90° quadrants of the circular face of base 40. For purposes of identification, groove 42 is in quadrant I; groove 44 is in quadrant II; groove 46 is in quadrant III; and groove 48 is in quadrant IV.

The grooves 42, 44, 46 and 48 are covered with a thin sheet 38 of blackened silver or other material which has a low thermal capacity and high thermal conductivity, as stated previously. In addition, the sheet 38 has a high thermal conductivity normal to the surface and a low thermal conductivity parallel to the surface. Examples of such a material are pyrolitic graphite or a very thin sheet of silver, copper or aluminum.

The thin sheet 38 and grooves cooperate to form a series of passageways in the face of base 40. The length and flow area of these passageways are selected to provide laminar flow conditions as previously described. A centrally positioned common supply inlet 50 extends from a suitable pressurized supply source to the inner end of grooves 42, 44, 46 and 48. The outer ends of the grooves 42, 44, 46 and 48 have outlet ports 52, 54, 56 and 58, respectively.

The base 40 is positioned in a chamber (not shown), such as chamber 30, and is mounted relative to a parabolic or other type reflector 58 so that when an infrared source is at a point generally coaxial with the focus of the parabolic reflector the energy will be focused on the center of the base 40. This is illustrated in FIG. 3 which shows the base 40 greatly enlarged relative to the reflector. An infrared source A at a position coaxial with the focus of the reflector 58 causes rays to be reflected on the center of the base 40. However, an infrared source offset from the focus, such as infrared source B, will cause the energy to be focused on one or more of the quadrants on the face of base 40. As noted previously, the exposure of the laminar flow passageways to infrared energy causes a variation in the rate of flow of fluid through the passageway. The output of this device then, is fed to a fluidic device or devices to provide relative pressure outputs which indicate the direction of the infrared source.

An example of such an arrangement is provided by a pair of fluidic devices 60, 62. These devices may be proportional amplifiers having a pressure output from a pair of receiver ports 64, 66 and 68, 70, respectively, in response to deflection of power streams 72, 74. The laminar flow passageways on opposite quadrants of the base 40 are series connected to oppositely positioned control jets to achieve a bridgelike system. Specifically, outlet ports 58, 54 are respectively connected to control jets 76, 78 of fluidic device 60. In like fashion, ports 52 and 56 are connected to control jets 80 and 82 of fluidic device 62.

Thus, when the infrared energy is focused on one of the quadrants, the control jet to which the groove on that face is series connected has a decrease of flow relative to the opposite jet. The thin sheet 38 prevents heat transfer from the quadrant on which the energy is focused to the adjacent quadrants. Therefore, the receiver port for the control jet associated with the exposed quadrant experiences an increase in pressure and the opposite port experiences a decrease in pressure. If the focused energy is in the center of the disk the effect on flow through the grooves is equal and the pressure output of the receiver ports for the amplifiers remains unchanged. The pressure outputs of the fluidic devices 60, 62 may then be used to provide the logic input to a directional system.

An example of how this arrangement would work is shown in the following table, wherein the output of the fluidic devices 60, 62 is displayed in terms of increasing pressure (+), decreasing pressure (−), or no change in pressure (0), for various positions of the infrared source.

| Position of Focused IR Energy | Fluidic Device 60 | | Fluidic Device 62 | |
|---|---|---|---|---|
| | Port 64 | Port 66 | Port 68 | Port 70 |
| Center Port 50 | 0 | 0 | 0 | 0 |
| Quadrant I | + | | 0 | 0 |
| Quadrants I & II | + | − | + | − |
| Quadrant II | 0 | 0 | + | |
| Quadrants II & III | − | + | + | |
| Quadrant III | − | + | 0 | 0 |
| Quadrants III & IV | − | + | − | + |
| Quadrant IV | 0 | 0 | − | + |
| Quadrants IV & I | + | − | − | + |

It is to be noted that, in practice, the grooves which form the laminar flow passageways are extremely small and that it is possible to focus the infrared energy on the border between adjacent passageways and provide an equal effect on flow in both of the passageways. When the infrared energy focuses on the centrally positioned port 50 the flow through each of the passageways is effected equally.

The above system provides a highly simplified arrangement for indicating the direction of an infrared energy source. While this system indicates direction only, it is within the abilities of those skilled in the art to fashion circuits which indicate level in addition to direction. For this purpose it is necessary to understand that the cumulative effect on flow through the passageways is indicative of the level of infrared energy while the relative effect on flow is indicative of the position of the energy source. It is also pointed out that other sets of laminar flow elements may be utilized to give different indications of direction. For example, a pair of laminar flow elements may be used to indicate a position on either side of a reference plane.

The above arrangements of laminar flow elements render the fluidic infrared sensor insensitive to uncontrolled changes in the temperature environment in which the sensor is positioned. This is because the laminar flow elements are closely positioned to one another and are connected in pairs to opposite sides of the fluidic amplifier. Any variation in temperature, other than from the infrared source, changes equally the density and flow through the laminar flow elements. Since the laminar flow elements are connected in opposing fashion, the effect of density changes is cancelled, thereby enhancing the accuracy of the sensor.

The fluidic devices described above illustrate a few of the many system arrangements that may be devised to utilize fluidic devices which sense infrared energy.

Having thus described the invention, what I claim is novel and desired to be secured by Letters Patent of the United States is:

1. A fluidic device for sensing infrared energy, said device comprising:
   means for discharging a power stream;
   means for discharging a control stream against said power stream, thereby to deflect said power stream proportional to the flow of said control stream;
   means for receiving said power stream, said receiver means being positioned to provide a pressure output responsive to the degree of deflection of said power stream;
   a laminar flow element, series connected with said control stream discharge means, said laminar flow element comprising a base of insulating material and having groove means formed in one side of the base, said base having passageways extending from the ends of said groove means for connection with said control stream discharge means;
   a sheet of low thermal capacity, high conductivity, nonreflective material positioned over said first side to form passageway means in combination with said groove means, the length and flow area of said passageway means being of sufficient magnitude to maintain laminar flow for the operating conditions of said fluidic device;
   means for concentrating infrared energy on the first side of said laminar flow element, said laminar flow element being adapted to convert said energy into heat transmitted to said control stream for varying the flow of fluid through said laminar flow element proportional to the level of exterior infrared energy;

whereby fluid flow through said laminar flow element and the pressure output of said fluidic device is proportional to the level of said infrared energy.

2. A fluidic device as in claim 1 further comprising:

means for forming a chamber around said laminar flow element and having an opening therein positioned to permit exposure of the first side of said laminar flow element to infrared energy;

said chamber means being formed from thermal insulating material and having reflective interior walls for maximizing the effect of infrared energy on said laminar flow element.

3. A fluidic device as in claim 2 wherein the sheet of said fluidic device comprises a thin layer of silver having a blackened surface.

4. A fluidic device as in claim 3 wherein said infrared concentrating means comprises a parabolic reflector having a focus point in line with the opening in said chamber means for concentrating infrared energy on said sheet.

5. A fluidic device for sensing the direction of a source of infrared energy, said device comprising:

at least a pair of laminar flow elements positioned in a plane and symmetrical with respect to a centrally positioned point;

means for providing a flow path for control fluid through said laminar flow elements;

a parabolic reflector for receiving infrared energy and focusing said energy on said centrally positioned point when the source of the infrared energy is at a point generally coaxial with the axis of revolution of said parabolic reflector and for focusing said energy on one of said elements when the source is offset from said axis;

fluidic amplifier means receiving control inputs from said laminar flow elements for providing a pressure output as a function of the relative flow rate of control fluid from said laminar flow elements;

said laminar flow elements being adapted to convert the infrared energy focused thereon into heat transmitted to the control fluid for varying the flow input to said fluid amplifier means proportional to the level of the infrared energy;

whereby the pressure output of said fluidic amplifier means is indicative of the position of the source of infrared energy.

6. A fluidic device as in claim 5 wherein said laminar flow elements comprise:

a base element of insulating material and having at least a pair of grooves formed in one face thereof;

a sheet of material positioned over said base to form in combination with said grooves at least a pair of laminar flow passageways, said sheet having low thermal capacity, low thermal conductivity parallel to its surface and high thermal conductivity normal to its surface;

means for providing a passageway from the ends of said grooves through said base to said control fluid passageway means.

7. A fluidic device as in claim 6 wherein said base has a circular face and two pairs of said grooves are oppositely positioned on said face, each groove being positioned in a 90° quadrant of said face.

8. A fluidic device as in claim 7 wherein said fluidic amplifier means comprise:

a pair of proportional amplifiers having oppositely positioned control jets connected to passageways formed in opposite quadrants of the circular face of said base so that the pressure output of said amplifiers is responsive to the position of infrared focused energy on said base.

9. A fluidic device as in claim 8 further comprising:

means for forming a chamber around said laminar flow element and having an opening therein positioned to permit exposure of said laminar flow element to infrared energy;

said chamber means being formed from thermal insulating material and having reflective interior walls for maximizing the effect of infrared energy on said laminar flow element.